M. N. PRANGE.
CLUTCH.
APPLICATION FILED AUG. 26, 1911.

1,020,778.

Patented Mar. 19, 1912.

3 SHEETS—SHEET 1.

M. N. PRANGE.
CLUTCH.
APPLICATION FILED AUG. 26, 1911.

1,020,778.

Patented Mar. 19, 1912.
3 SHEETS—SHEET 2.

WITNESSES

INVENTOR
Maurice N. Prange
BY
ATTORNEYS

M. N. PRANGE.
CLUTCH.
APPLICATION FILED AUG. 26, 1911.

1,020,778.

Patented Mar. 19, 1912.
3 SHEETS—SHEET 3.

WITNESSES
John A Bergstrom
J. Harl Anderson

INVENTOR
Maurice N. Prange
BY Munn & Co
ATTORNEYS

UNITED STATES PATENT OFFICE.

MAURICE NOWAL PRANGE, OF DETROIT, MICHIGAN.

CLUTCH.

1,020,778.  Specification of Letters Patent.  Patented Mar. 19, 1912.

Application filed August 26, 1911. Serial No. 646,136.

*To all whom it may concern:*

Be it known that I, MAURICE N. PRANGE, a citizen of the United States, and a resident of Detroit, in the county of Wayne and State of Michigan, have invented a new and Improved Clutch, of which the following is a full, clear, and exact description.

The object of the present invention is to produce a combined disk and radial shoe clutch, particularly adapted for motor vehicles, so constructed and arranged that while the vehicle is traveling over comparatively smooth and level roads the clutch engagement will be yieldingly and automatically maintained, and further, to provide means whereby when the vehicle is ascending a grade, one of these clutches may be positively and forcibly brought into action to insure against any accidental slipping of the clutch engagement, and further to provide means common to both clutches whereby they may be instantly released when required.

A further object of the invention is to provide for a ready renewal of the friction surface of the friction clutch members whereby portions of the said friction surfaces which may have become worn, may be removed and replaced without the necessity of renewing the entire frictional surface.

With the foregoing objects in view, the present invention consists of the devices and combinations of devices which will be hereinafter set forth and claimed.

Reference is to be had to the accompanying drawings forming a part of this specification, in which similar characters of reference indicate corresponding parts in all the views, and in which—

Figure 1:
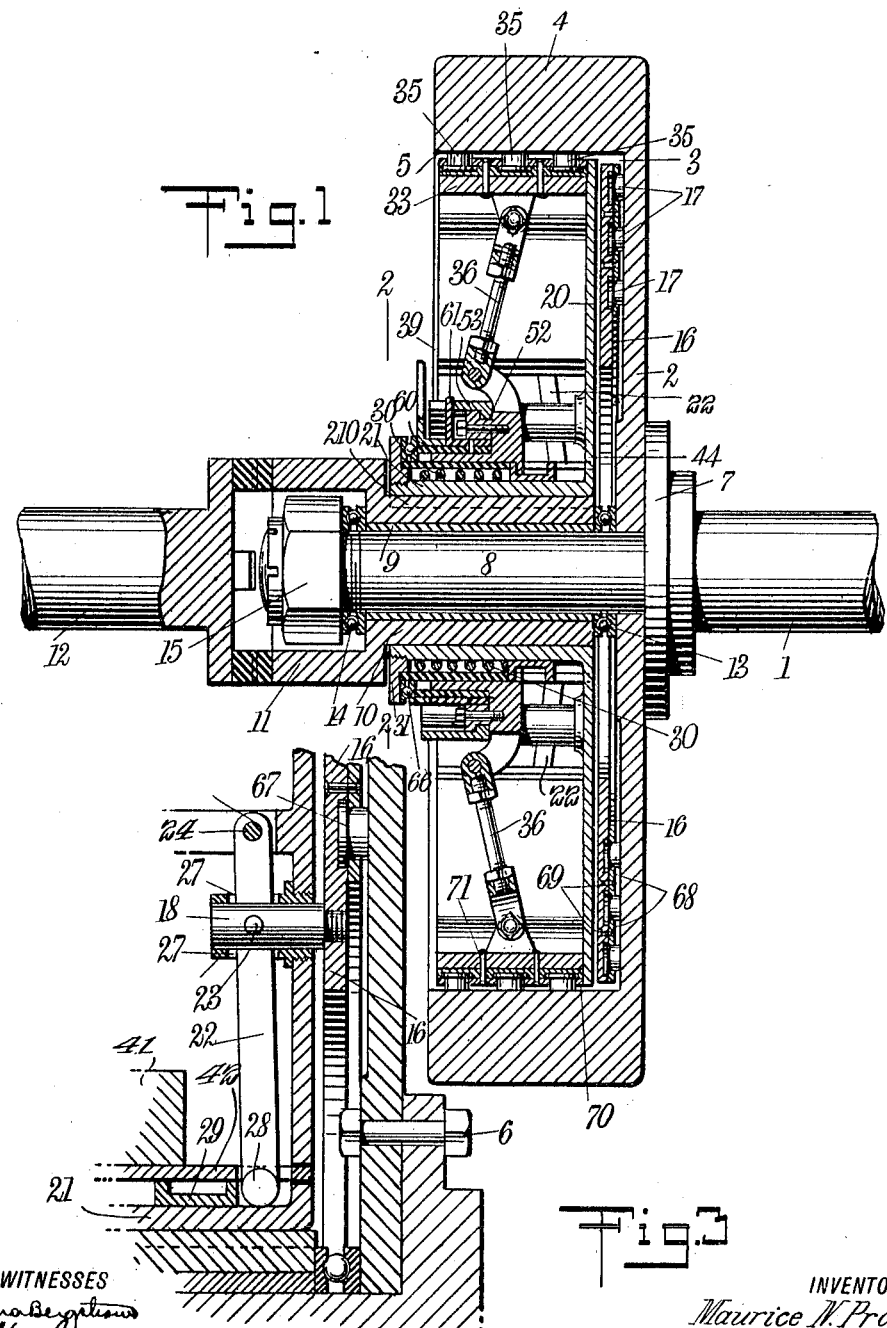
Figure 2:
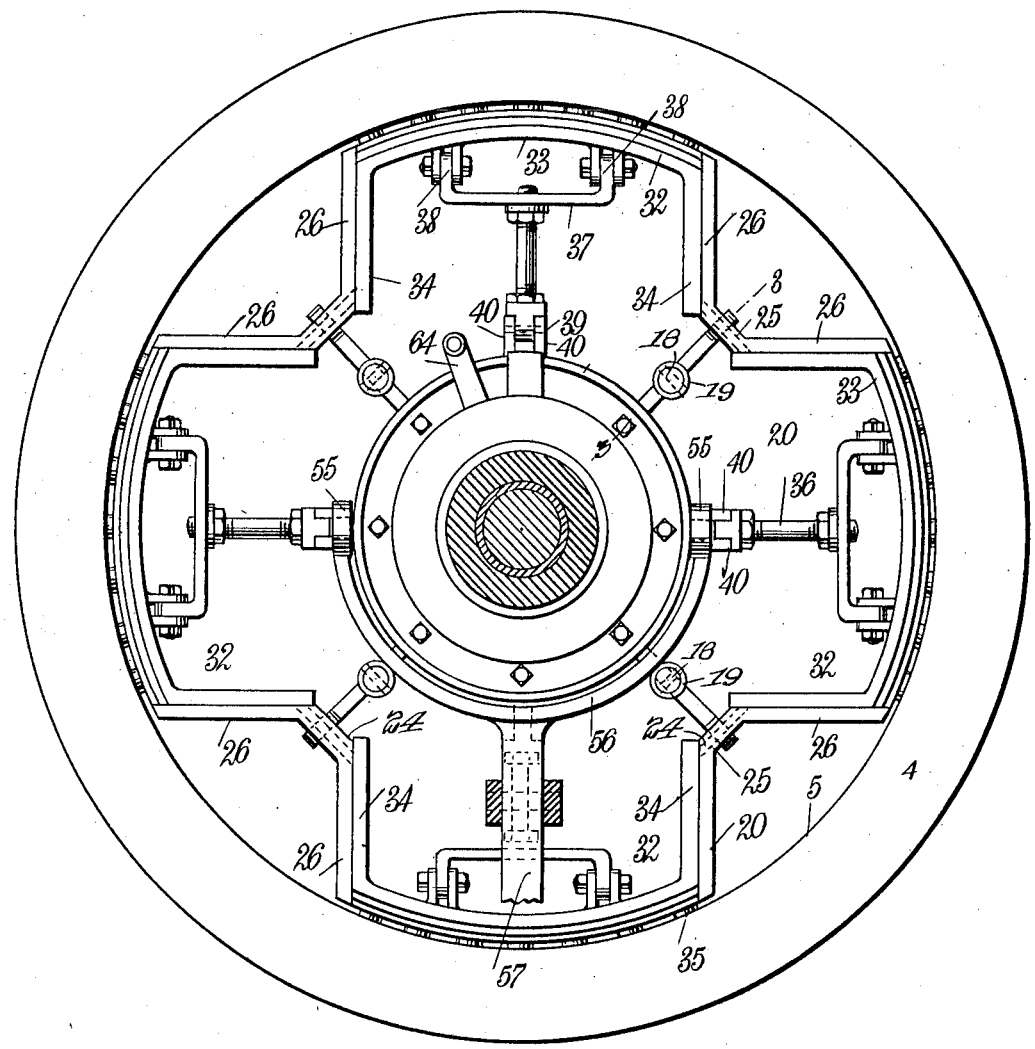
Figure 4:
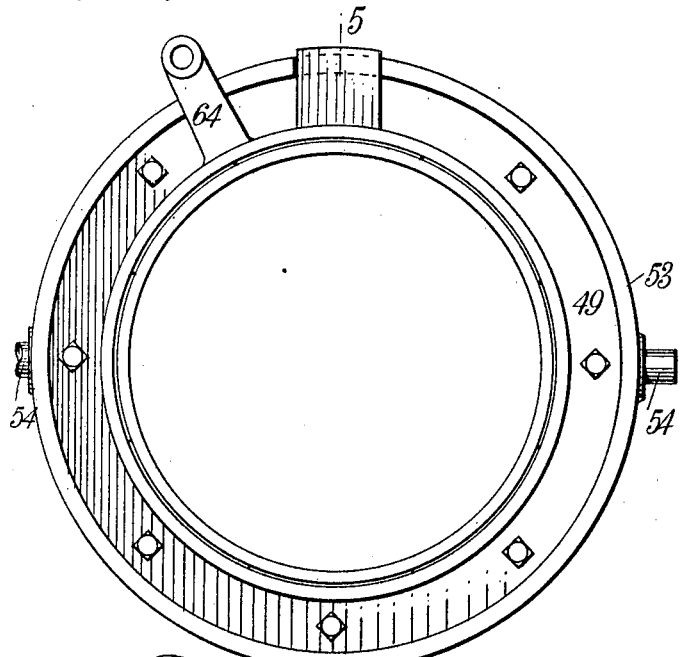
Figure 5:
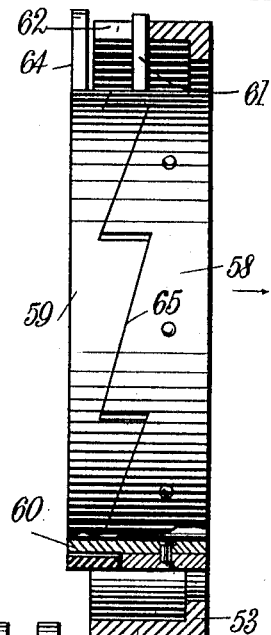
Figure 6:
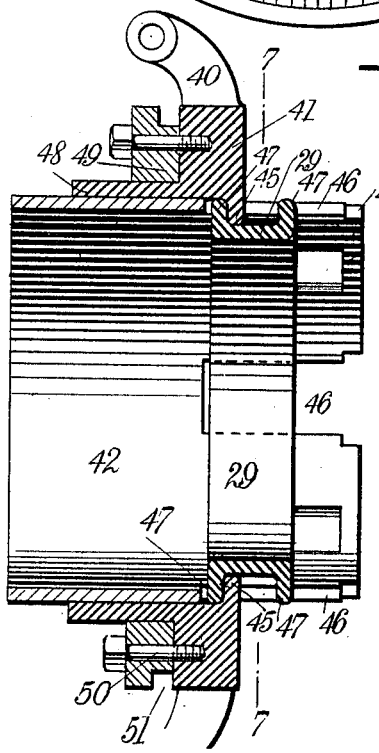
Figure 7:
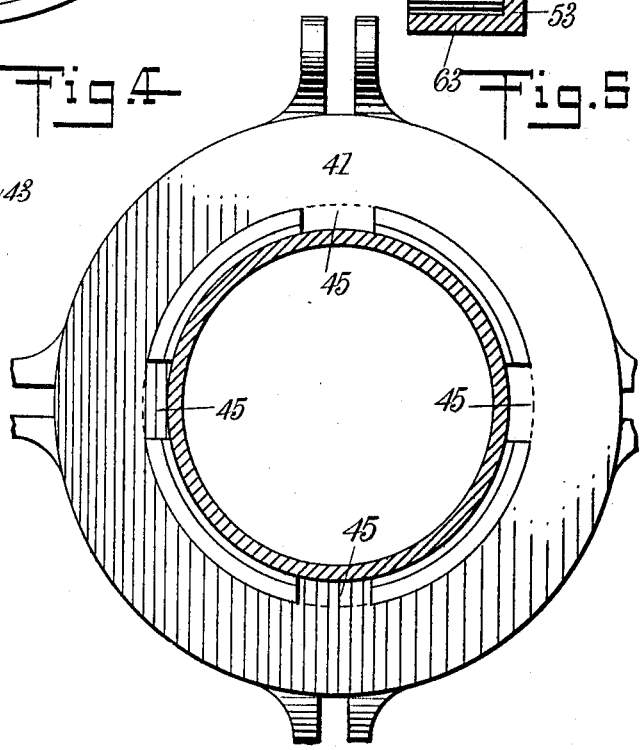

Figure 1 shows a vertical sectional view taken on a line cutting one of the diameters; Fig. 2 shows a side elevation looking toward the right in Fig. 1, the shaft and other parts being shown in section on the line 2—2 in Fig. 1; Fig. 3 is a view somewhat enlarged on the line 3—3 in Fig. 2; Fig. 4 shows a face view of the shifting ring and the cams for operating the radial shoe clutch; Fig. 5 is a vertical section taken on the line 5—5 in Fig. 4; Fig. 6 shows a vertical section through the shifting sleeve and its supporting sleeve, and also shows the sliding collar; and Fig. 7 is a sectional view taken on the line 7—7 in Fig. 6, looking toward the left in that figure.

In the drawings, 1 represents a driving shaft, although it is to be understood that it may constitute a driven shaft, dependent upon whether it is desired to transmit power from said shaft, or to it. Upon the shaft 1 is mounted a driving clutch member 2 which is constructed in the form of a fly wheel, having a web, the inner face 3 of which constitutes one member of the disk clutch, and which is provided with a circular weighted flange 4, the inner face 5 of which constitutes one part of the radial shoe clutch This fly wheel 2 is fixedly secured to the shaft 1 by means of bolts 6, which pass through the web portion of said wheel and through a collar 7 formed integrally with the shaft 1, and thus the fly wheel and shaft 1 rotate together at all times. Projecting from the shaft 1, and in axial alinement therewith, there is a post 8 somewhat reduced in diameter with relation to the shaft 1, and upon this reduced portion 8 there is a thimble 9 which forms a bearing for the sleeve 10 which carries a part of the differential driving connection 11 with the driven shaft 12 which is connected with the driving wheels of the vehicle. The sleeve 10 abuts at one end against a ball thrust 13, and at its opposite end against a ball thrust 14, and these parts are all held upon the post 8 by means of a nut 15 fitting upon the threaded end of said post. The arrangement is such that the sleeve 10 may at all times turn with the post 8 and the driving shaft 1, or it may remain at rest while the shaft and post revolve freely within said sleeve.

The disk clutch comprises a ring plate 16 which carries upon its face adjacent to the inner face 3 of the web of the fly wheel, friction plugs or blocks 17, to be hereinafter described, and said ring plate 16 is mounted upon plungers 18 projecting from the inner face of said ring plate, and mounted to slide in tubular bearings or sleeves 19 carried by a web 20 of a sleeve 21, which is connected to the sleeve 10 by a spline 210. There are four of the plungers 18, disposed at points substantially 90° from each other, and the reciprocations of the plungers 18 in the bearings 19 result in a movement of the disk ring 16 toward and from the inner face of the web of the fly wheel 2, according as it is desired to effect the clutch connection or to overcome such action. The plungers 18 are each connected to levers 22 by means of pins 23, said levers at their upper ends being pivotally mounted on pins 24 mounted in a portion 25 of substantially V-shaped webs carried by the web 20, and constituting guides 26 for the radially operating friction shoes, which will be hereinafter described. The levers 22 pass down through slots 27 formed at diametrically opposite points in the sleeves 19, and the lower ends 28 of said levers are designed to be engaged by a sliding collar 29, mounted upon the sleeve 21. The ring 29 is intended to slide freely along the sleeve 21, and it is forced toward the right as the device is shown in Fig. 1, by means of a helical spring 30, which surrounds the sleeve 21, and has a bearing at one end against the sliding collar 29, and at its opposite end against a collar 31 screwed upon the end of the sleeve 21. From the foregoing it will be understood that the spring 30 constantly acts to force the sliding collar 29 against the inner ends of the levers 22 and thus to move the plungers 18 and the disk ring 16 supported thereby, toward the web of the fly wheel 2, to cause the frictional plugs 17 to frictionally engage the inner clutch face 3 of the web of the fly wheel, and this constitutes a clutch connection between the sleeve 21 and the driven shaft 12, with the driving shaft 1, and this driving connection will be always maintained unless overcome, as will be hereinafter set forth.

The radial shoe clutch comprises a plurality of radially operating shoes 32, which have curved portions 33 substantially concentric with the inner clutch face 5 of the rim 4 of the fly wheel, and with inwardly extending arms 34 fitted between, and guided by the guides 26 mounted upon the web 20, in such manner that while they are free to slide radially, they are fixedly held against any circular movement independent of the web 20. The curved portions 33 of the shoes 32, carry upon their outer surfaces friction plugs 35, similar to the plugs 17 of the disk ring 16, and which will be hereinafter described.

The radial movement is imparted to the shoes 32 by means of adjustable links 36, which at their upper ends carry yokes 37 which are pivotally connected at 38 to the inner surfaces of the curved parts 33 of the shoes 32. The lower ends of the links 36 are pivotally connected at 39 to the radially extending arms 40 of a shifting sleeve 41. This shifting sleeve 41 is mounted to have a sliding movement along a bearing sleeve 42, which at its inner end is provided with segmental lugs 43 arranged to engage segmental slots 44 in the web 20, and the opposite end of the sleeve 42 is forcibly engaged by the collar 31. The sleeve 42 covers and incloses the spring 30, and affords a sliding bearing for the shifting sleeve 41. The shifting sleeve 41 is provided upon its inner periphery with radially extending lugs 45 arranged to engage slots 46 cut in the bearing sleeve 42. The lugs 45 serve to guide the shifting ring 41 along its bearing sleeve 42 and prevent any relative turning movement between said sleeves. The lugs 45 of the shifting ring 41 also engage between the radially projecting lugs 47 of the sliding collar 29, the collar 29 being of such width and the lugs 47 being spaced apart to such an extent as to permit a movement of the shifting sleeve 41 within certain limits, without imparting movement to the collar 29, but a movement of the shifting sleeve 41 toward the left, viewed in Fig. 1, will carry with it the collar 29 by reason of the engagement of the lugs 45 of the shifting sleeve 41 with the lugs 47 at the left of the collar 29, and this movement of the shifting sleeve toward the left, will overcome the tension of the spring 30, and thus remove all frictional contact between the members of the disk clutch. The shifting sleeve has projecting from its left-hand side, an extended cylindrical bearing 48, and it has surrounding said bearing a ring 49 which is bolted to the shifting sleeve by means of bolts 50. The ring 49 has an inner rabbeted edge 51 forming a seat or bearing for the flange 52 of the shifting ring 53. The shifting ring 53 is provided with trunnions 54, engaged by bearings 55 carried by a yoke 56 of a shifting lever 57. By means of the shifting lever 57 and its engagement with the shifting ring, said ring may be moved to impart a sliding movement to the shifting sleeve 41 toward the left, as the apparatus is shown in Fig. 1, and thus move the sliding collar 29 away from the lower ends of the levers 22, and positively withdrawing the friction shoes of the shoe clutch against the tension of the spring 30.

To some extent the spring 30 acting upon the collar 29 not only causes a normal yielding frictional engagement of the members of the disk clutch, but it also through the connection of the shifting sleeve 41 with said collar, effects a normal yielding frictional engagement of the radially acting clutch members.

While there are no means in the apparatus to impart a positive frictional engagement of the clutch members of the disk clutch, means are provided whereby the radially movable shoes of the shoe clutch may be positively thrown into clutching engagement with the other member of that clutch. These means constitute cam ring members 58 and 59, the cam 58 being riveted to a sleeve 60 and having a radially projecting arm or lug 61 which engages a notch or seat 62 in the flange 63 of the shifting ring 53. The cam 59 is arranged to turn on the sleeve 60 and it is provided with a radially projecting member 64 which is intended to be connected to operating devices under the control of the operator, whereby the cam 59 may be turned with relation to the relatively fixed cam 58. The meeting faces of the cams 58 and 59 will be provided with complementary inclined surfaces 65 which tend to force the cams apart when the cam 59 is turned in one direction, and to permit them to approach each other when the cam 59 is turned in the opposite direction. These cams are confined between the shifting sleeve 41 and a thrust bearing 66 confined by the collar 31, so that a turning of the cam 59 in one direction will cause the cam 58 to move the shifting sleeve 41 toward the right, as the device is shown in Fig. 1, thus rocking the links 36 in a direction to force the brake shoes radially against the inner braking face 5 of the fly wheel 2. This movement of the shifting sleeve 41 toward the right to secure a positive engagement of the members of the shoe clutch, will be to such an extent as to carry the links 36 at their inner ends somewhat beyond the center so that the clutch members of the shoe clutch will remain in frictional or driving connection without the necessity of employing any locking devices.

The friction plugs 17 and 35 will be made of relatively soft and yielding material, preferably cork, and at their inner ends they are provided with integral flanges 67. The plugs 17 are held to the face of the disk ring 16 by means of rings 68 which are held to the disk ring 16 by rivets 69, and the plugs 35 of the clutch shoes 32 are held to the outer surfaces of said shoes by means of segmental plates 70, held to the shoes by rivets 71. It will be noted that any of the plugs, or group of plugs, may be removed and replaced without the necessity of renewing all of them.

In the operation of the apparatus, assuming that Fig. 1 shows the normal position of the parts when the spring 30 alone causes the frictional engagement of the clutch members, should it be desired to increase the clutch connection, a positive clutching action of the clutch shoes may be secured by turning the cam 59 with relaion to the cam 58. This will cause the shifting ring 41 to move toward the right, thus rocking the levers 36 and forcing the clutch shoes 32 radially outwardly, and if the movement is carried to such an extent as to carry the inner ends of the links beyond the center, this positive clutching connection will continue without the assistance of any locking device. Should it be desired to positively disconnect the radial clutch members and to overcome the tension of the spring 30 and thus prevent its action on the disk clutch members, the lever 57 will be rocked and through the yoke 56 move the shifting ring 53 toward the left, as shown in Fig. 1, the shifting ring bearing with it the shifting sleeve 41, and the sleeve 41 carrying with it the sliding collar 29.

Having thus described my invention, I claim as new and desire to secure by Letters Patent:—

1. In combination, a clutch member having clutch faces disposed at right angles to each other, a clutch member having independently movable clutch faces for engaging the clutch faces of the first clutch member, a constantly acting yielding mechanism for connecting the clutch faces of both clutch members, a positively operating mechanism for connecting one pair of the clutch faces, and a common means for disconnecting both pairs of clutch faces.

2. In combination, a driving clutch member, a driven clutch member, comprising a sliding disk for connecting the driving and driven clutch members, a spring for normally forcing said members into contact, a shifting ring, intermediate connections acting on said spring for releasing said clutch members, and means for actuating said shifting ring.

3. In combination, a driving clutch member and a driven clutch member, independent contacts carried by the driven clutch member adapted to engage the driving clutch member, a spring for throwing said contacts into operation, a cam for positively throwing one of said contacts into operation, and mechanism for withdrawing both of said contacts.

4. In combination, a driving clutch member having clutch faces disposed at right angles to each other, independently movable clutch members for engaging the clutch faces of the driving clutch member, a spring and mechanism for yieldingly causing the engagement of the clutch members, means for positively engaging one of the movable clutch members, and the driving clutch member, and means for overcoming the yielding engagement of the clutch members.

5. In combination, a clutch member comprising a fly wheel, a disk clutch adapted to engage the web of the fly wheel, a web mounted within the flange of the fly wheel, means for connecting said web to said disk clutch radially acting clutch shoes mounted on said web, yielding mechanism for throwing the disk clutch and the shoes in contact with the fly wheel, means for positively moving the clutch shoes into contact with the flange of the fly wheel, and means to disengage both clutches.

6. In combination, a web carrying radially acting clutch shoes, plungers mounted to slide in said web, a disk clutch member carried by said plungers, levers pivotally mounted on said web and connected to said plungers, a sleeve connected to said web, a sliding collar mounted on said sleeve and engaging the lower ends of said levers, a shifting sleeve mounted on said web sleeve and in engagement with the sliding collar, links pivotally connected to the shifting sleeve and the radially acting clutch shoe, a spring engaging and moving the sliding collar, and a shifting ring for moving the shifting sleeve and sliding collar, and a driving clutch member having clutch faces coöperating with the disk and shoe clutch members.

7. A clutch having a clutch member, yielding plugs having at their inner ends a flange, and independent confining plates for detachably securing said plugs to the clutch member.

In testimony whereof I have signed my name to this specification in the presence of two subscribing witnesses.

MAURICE NOWAL PRANGE.

Witnesses:
JAS. MACQUEEN,
GEORGE J. FINN.

Copies of this patent may be obtained for five cents each, by addressing the "Commissioner of Patents, Washington, D. C."